(12) United States Patent
Loveland

(10) Patent No.: US 6,829,584 B2
(45) Date of Patent: Dec. 7, 2004

(54) VIRTUAL HOME DATA REPOSITORY AND DIRECTORY

(75) Inventor: James B. Loveland, Orem, UT (US)

(73) Assignee: Xactware, Inc., Orem, UT (US)

( * ) Notice: Subject to any disclaimer, the term of this patent is extended or adjusted under 35 U.S.C. 154(b) by 285 days.

(21) Appl. No.: 09/750,380

(22) Filed: Dec. 28, 2000

(65) Prior Publication Data

US 2001/0051883 A1 Dec. 13, 2001

Related U.S. Application Data

(60) Provisional application No. 60/174,113, filed on Dec. 31, 1999.

(51) Int. Cl.⁷ .............................................. G06F 17/60
(52) U.S. Cl. ............................................. 705/7; 705/4
(58) Field of Search .............................. 705/1, 4, 7, 26, 705/38; 345/619

(56) References Cited

U.S. PATENT DOCUMENTS

| | | | | |
|---|---|---|---|---|
| 5,794,216 A | * | 8/1998 | Brown | 705/27 |
| 5,862,325 A | * | 1/1999 | Reed et al. | 709/201 |
| 6,061,692 A | * | 5/2000 | Thomas et al. | 707/200 |
| 6,345,258 B1 | * | 2/2002 | Pickens | 705/1 |
| 6,473,794 B1 | * | 10/2002 | Guheen et al. | 709/223 |
| 2002/0032626 A1 | * | 3/2002 | DeWolf et al. | 705/35 |

FOREIGN PATENT DOCUMENTS

JP 11-96217 A * 4/1999 .......... G06F/17/60

OTHER PUBLICATIONS

Piper, James. "A New Spin on Facility Management." Building Operating Management, vol. 46, No. 7, p. 36 (start page), Jul. 1999.*

* cited by examiner

Primary Examiner—Susanna M. Diaz
(74) Attorney, Agent, or Firm—Kirton & McConkie; Michael F. Krieger

(57) ABSTRACT

The present invention relates to a computer accessible system for electronically storing a model which communicates the physical attributes of a structure along with warranty, insurance and other information relative to that structure. The system of the present invention integrates physical information in a model which is displayed as a physical representation of the structure with other non-physical information. Selecting specific areas of the model provides access to data regarding non-physical characteristics of that area of the structure and the contents thereof. Data relevant to warranties, insurance, maintenance or other information can be accessed by selecting portions of the model or indices attached or related to that portion. Systems of the present invention allow multiple users to remotely access the information and model via a computer network, such as the Internet, in order to make informed decisions regarding the structure and its characteristics.

7 Claims, 10 Drawing Sheets

US 6,829,584 B2

VIRTUAL HOME DATA REPOSITORY AND DIRECTORY

RELATED APPLICATIONS

This application claims priority to Provisional Application Ser. No.-60/174,113, filed Dec. 31, 1999.

THE FIELD OF THE INVENTION

The present invention relates to methods and apparatus for storage and retrieval of information relating to a structure, such as a home, office or similar structure. The information is stored electronically on a computer-based system and may be accessed directly from a single computer or over a computer network. Information about the structure's physical attributes can be stored as a two- or three-dimensional model of the structure which can be viewed on a display. The model database may also be queried for specific details such as room dimensions, materials, and areas. The contents of each room may also be stored in the system including floor and wall coverings, but also including furniture and semi-stationary items such as vases, artwork and appliances. In addition to physical attributes and contents, the system can store information regarding required and recommended maintenance schedules, warranty requirements and terms, insurance details, dates of purchase, vendor identification, anticipated life spans and other information pertinent to a structure, its history, its contents, its occupants or related items.

BACKGROUND

Modern structures and other structures are typically designed and built to last for a century or more. During their lifetimes structures can undergo extensive changes, but often retain key structural elements throughout their usable lives. While these key elements remain somewhat static, other structure elements can change relatively quickly. Structure framing and structural elements remain fairly static while paint, carpet and other wearable items are replaced regularly. When items are replaced, the owner will typically arrange for a contractor to measure the element that needs to be replaced and estimate the cost of replacement. This will generally involve a trip to the site by the contractor or other tradesman who will measure the item and estimate a cost for replacement or repair. For each item, an owner may solicit several estimates necessitating several trips and several measurements so that each estimator may calculate a bid for the project.

Projects can be further complicated by warranties and insurance policies with requirements and restrictions which must be met by participating contractors and the owner. Often an insurance adjustor must also visit the site and make independent measurements and assessments.

Sometimes, a history of what has happened to the structure is required for insurance or warranty purposes. This information may also need to be solicited by multiple parties making repeated dissemination by the owner tedious and error-prone.

When a structure changes ownership, some warranties and insurance policies will carry over to the new owner. Information pertinent to the structure and the policies must be accurately transferred between the old and new owners. This process will often be neglected or forgotten and inaccurate or false information will result. It is also beneficial to have a record of the tradesman and their addresses in case the work performed is faulty.

Furniture, artwork, appliances and personal items that are kept within a structure may also be covered by various insurance policies and warranties. An accurate inventory of these items and information regarding their coverage can be a valuable asset. Especially when theft or fire occurs, an accurate inventory including the location of the items will be invaluable in settling insurance and warranty claims.

A record of the location of valuable documents can also be an asset. Wills, investment records, deeds and other important documents may be located in a location hidden in the structure. A password-protected confidential location for these documents would be beneficial for access by specific relatives or personnel when needed.

An accurate and descriptive database including a three-dimensional model, photographs and listings of contents, warranties and other information can also be a great asset at the time a structure is sold. When a buyer can access all this information from one source, both the buyer and seller will benefit from a more informed negotiation and deal.

SUMMARY AND OBJECTS OF THE INVENTION

The present invention features an electronic model and data storage system for storing and maintaining information related to a structure. The structure may be a home, a commercial office building, or any other structure. The system as described herein comprises: 1) an electronic model of the physical features and attributes of said structure; 2) feature-specific information pertaining to the features and contents of said structure; and 3) non-physical information pertaining to said structure. The model and the feature-specific information and the non-physical information are each accessible via a computer network, either local or internal or from a global information network such as the Internet.

The present invention further features a method for storing and maintaining information related to a structure on a data storage system for subsequent retrieval. The method comprises the steps of: 1) providing and storing an electronic model of the physical features and attributes of the structure on an accessible computer network; 2) assembling feature-specific information pertaining to the structure, the information also stored on the accessible computer network; and 3) assembling non-physical information pertaining to the structure, the non-physical information also stored on the accessible computer network.

Some embodiments of the present invention provide an electronic model and data storage system for storage of a structure's physical attributes and other information related to the structure. Some embodiments combine a two- or three-dimensional model of the physical features of a structure with a database or file structure which comprises additional feature-specific non-physical information including, but not limited to, warranty information, maintenance requirements and recommendations, purchase dates, vendor identification, anticipated life spans, wear and tear schedules, insurance coverage, location of and information regarding structure components or contents and similar information regarding furnishings and appurtenances of the structure.

Embodiments of this electronic model and data storage system can be accessible via a computer network and, more particularly, via a global information network such as the Internet. As such, the present invention also features a computer-readable memory for storing and maintaining information related to a structure.

These embodiments can facilitate the exchange of information by allowing interested parties to remotely access the model and data storage for information regarding the structure, its elements or related information. For example, if an owner desires to replace carpet in specific rooms of the structure, the owner can inform eligible contractors of his desire and allow the contractors to access the electronic model of the structure for the purposes of measuring and estimating the cost of the replacement. Simultaneously, insurance adjustors and other interested parties can access identical information in the same way. Along with the physical attributes of the room, other pertinent information can be stored. In the case of carpet replacement, the quality, age and condition of the existing carpet can be stored so that contractors can estimate the needed quality or durability of a replacement. The structure owner may also store information specific to the estimate such as a desired life span for the replacement carpet, desired stain-resistance or other features. This same information can be stored for every feature of the structure and can be updated periodically to reflect a continuous history of structure maintenance and revision.

Maintenance requirements and information can also be stored in the system. These requirements may be stored in a static record or may be stored so as to activate prompts to the owner or designated others so that maintenance steps can be accomplished at recommended intervals. The system can be configured to automatically notify designated maintenance personnel to accomplish tasks at the recommended intervals or the owner can be prompted to arrange for the maintenance.

Accordingly, it is an object of some embodiments of the present invention to provide a system for storing and maintaining an electronic model of the physical attributes of a structure.

It is also an object of some embodiments of the present invention to provide a system for storing and maintaining non-physical information regarding a structure, its components, its contents and obligations and liabilities associated therewith.

Another object of some embodiments of the present invention is to provide a system for providing physical and non-physical information related to a structure to others via a computer network.

These and other objects and features of the present invention will become more fully apparent from the following, description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Preferred embodiments of the present invention provide centralized access to structure information so that owners, insurers, contractors, maintenance personnel and other users may access an accurate and reliable repository of information which communicates relevant attributes of the structure, its components, its contents and the obligations and liabilities related thereto.

Embodiments of this electronic model and data storage system can be accessible via a computer network and, more particularly, via a global information network such as the Internet. As such, the present invention also features computer-readable data transmission signal containing a data structure. The computer-readable data transmission signal comprises: 1) a first portion identifying an electronic model of a structure contained in a data storage system that a client is requesting from a server, wherein the client may receive detailed information regarding the physical characteristics of the structure; and 2) a second portion identifying a session for communicating between the client and the server, the session allowing a user to receive information pertaining to the structure. The computer-readable data transmission signal may include both feature specific information and non-physical information, or a combination of both.

In addition, a computer-readable memory for storing and maintaining information related to a structure is used. The computer-readable memory is configured so that it can be used to direct a computer: 1) to gather and store an electronic model of the physical features and attributes of the structure on an accessible computer network; 2) to gather and store feature-specific information pertaining to the structure, the information also stored on the accessible computer network; 3) to gather and store non-physical information pertaining to the structure, the non-physical information also stored on the accessible computer network; 4) to access and retrieve the information related to the structure; and 5) to present the information related to the structure to a graphical user interface. These steps may be conducted over a network such as an internal network, or a global information network such as the Internet.

Figure 1:
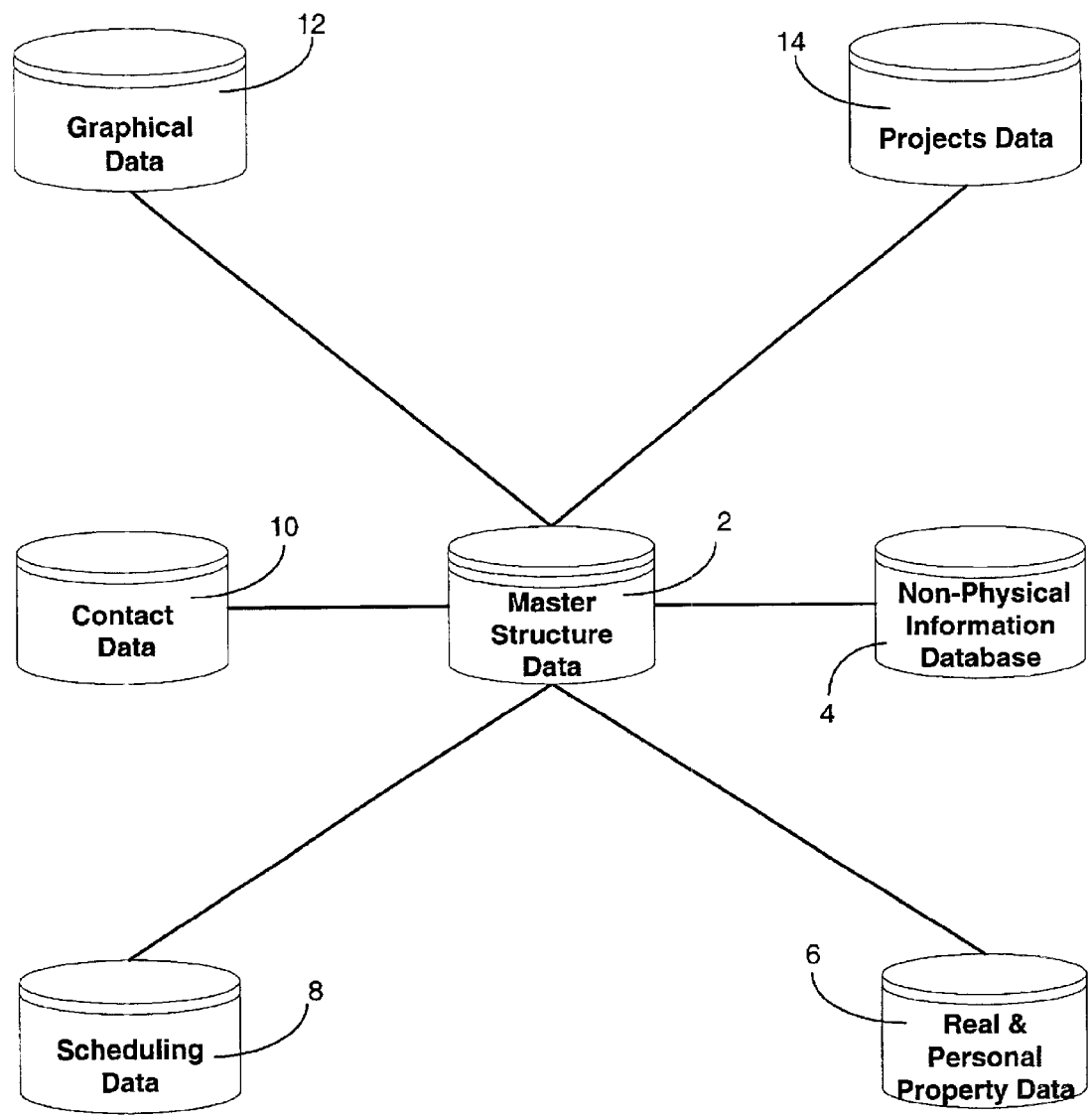
FIG. 1 is a diagram illustrating an exemplary master structure data.

FIG. 1 shows a general relationship between the embodiments of the present invention and how the various elements interact with one another to form master structure database 2. While not meant to be limiting, master structure data base 2 is shown to incorporate non-physical information database 4, real and personal property database 6, scheduling database 8, contact database 10, graphical database 12, and projects database 14. Each of these is described in greater detail below.

Figure 2:
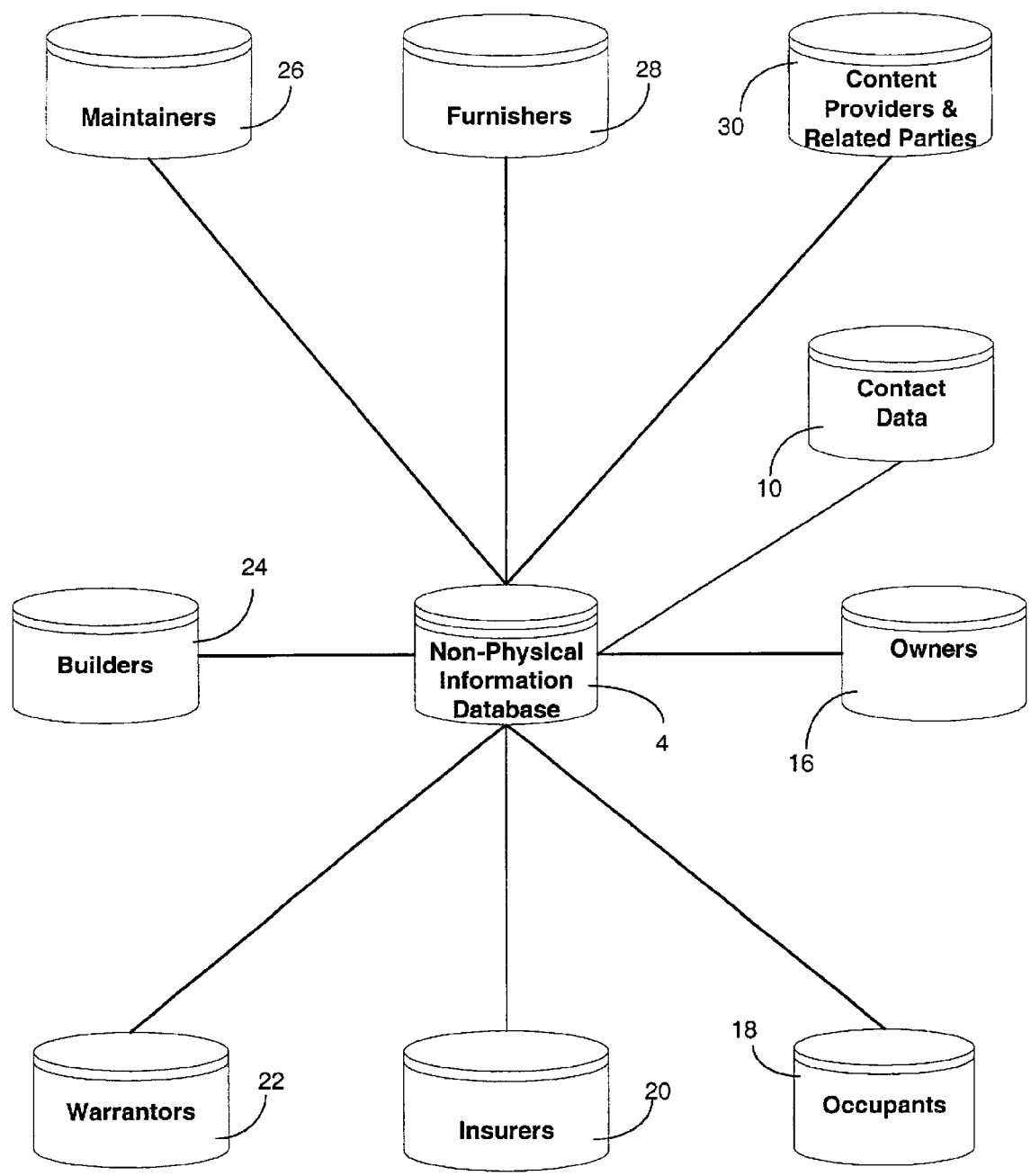
FIG. 2 is a diagram illustrating details of non-physical information data.

FIG. 2 depicts embodiments of the present invention integrating the attributes of a structure with non-physical information relative to the structure's elements such as: owners 16, occupants 18, insurers 20, warrantors 22, builders 24, maintainers 26, furnishers 28, content providers, related parties 30, etc. Contact information is also stored regarding all of the non-physical participants in contact data 10. This information is provided at a centralized network site so that all information pertinent to a structure or portion thereof can be accessed from a single source. Multiple parties may access this information repository so that several contractors, insurers or others may have simultaneous access to the information thereby speeding competitive bidding and other processes used by the system.

Figure 3:
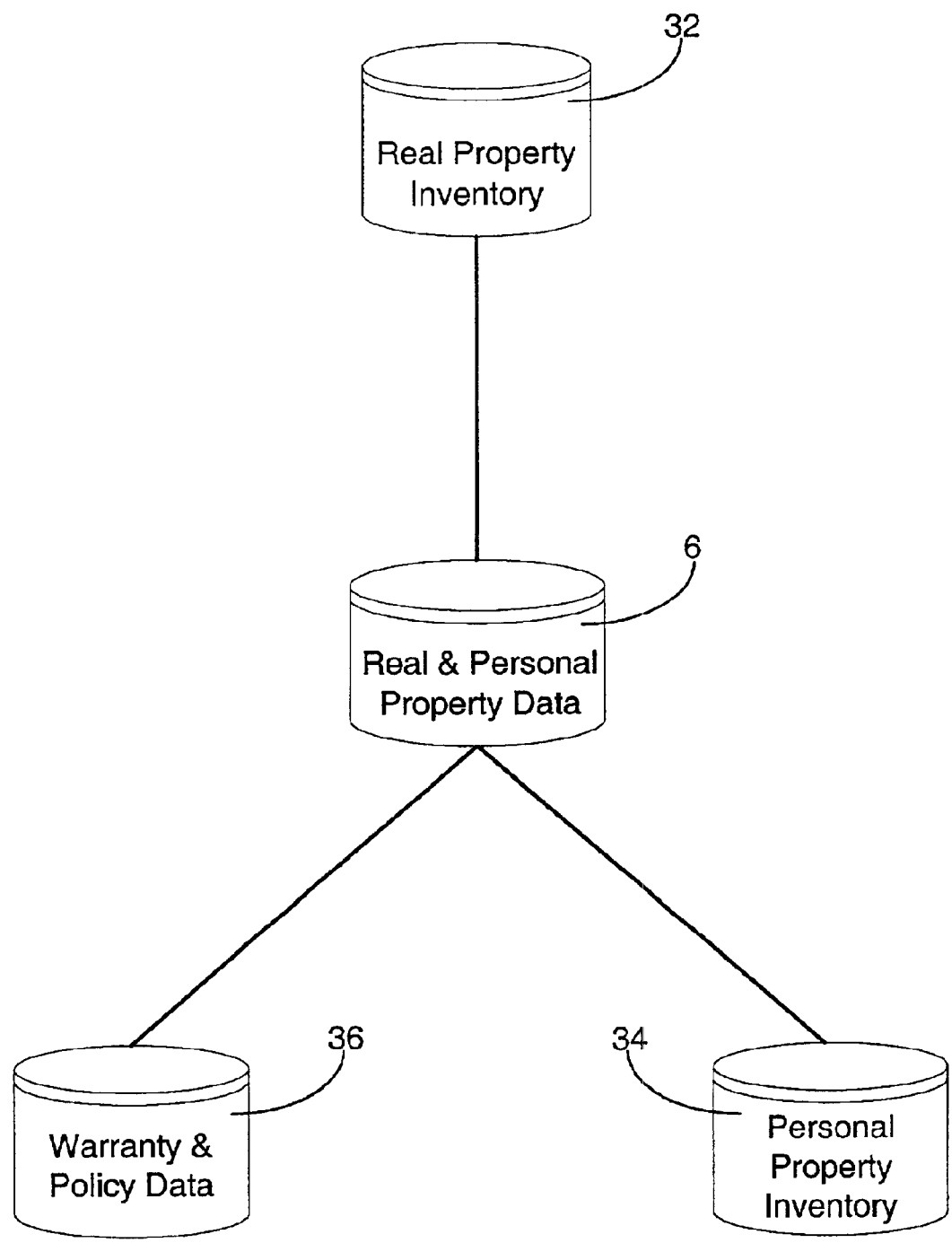
FIG. 3 is a diagram illustrating details of real and personal property data.

Preferred embodiments of master structure data 2 comprise an electronic model of a structure which accurately portrays real and personal property 6. FIG. 3 shows the relationship between the real property inventory 32, personal property inventory 34, and the warranty and policy data 36 for all items contained within real and personal property data 6.

Figure 4:
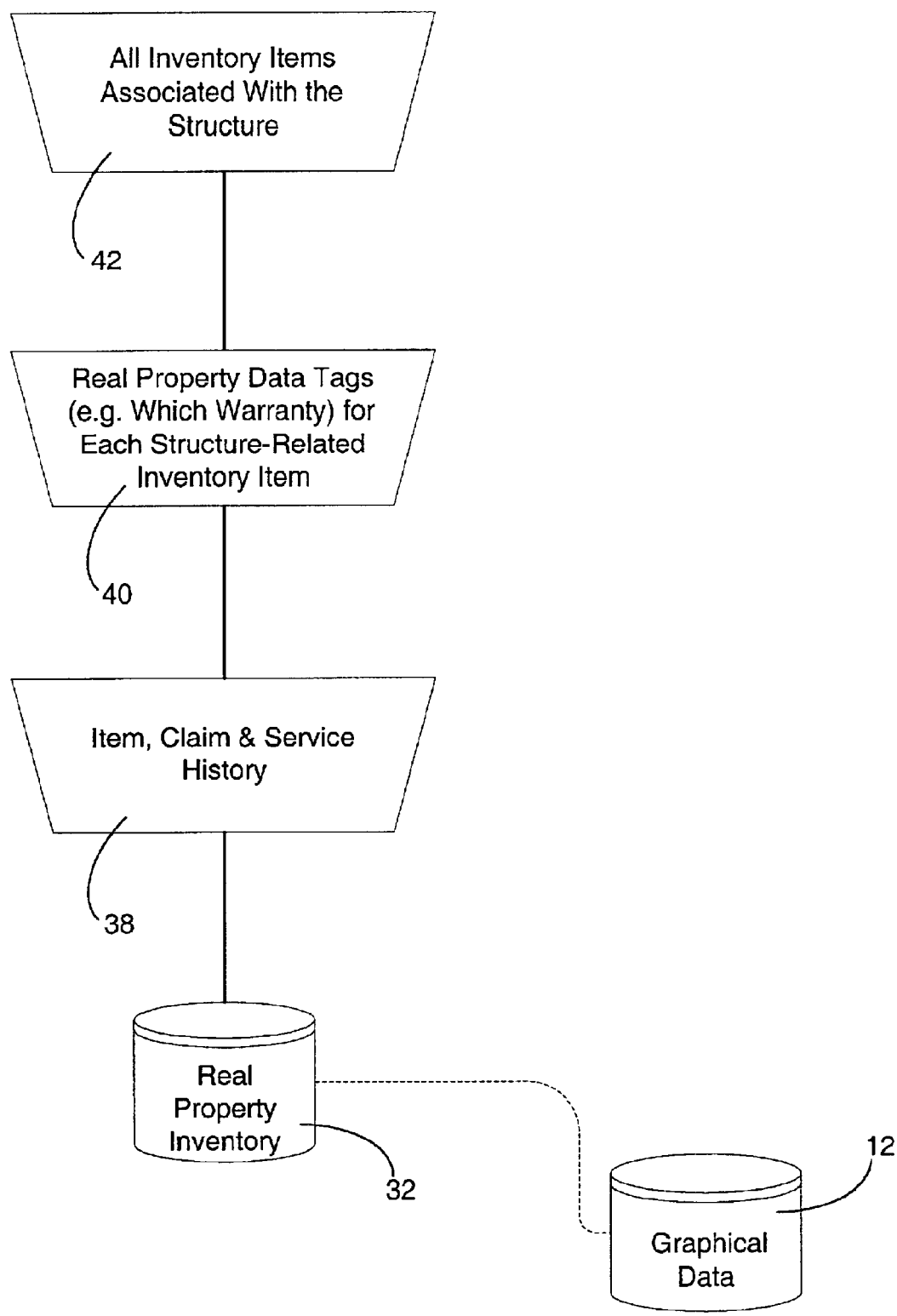
FIG. 4 is a diagram illustrating details of real property inventory.

Some embodiments of real property inventory 32 are exhibited in FIG. 4. Real property inventory 32 consists of all inventory items associated with the structure 42. Examples of inventory items 42 could be a three-dimensional model of elements comprising walls, floors, ceilings, roofs, structural members, finished surfaces, floor coverings, windows, doors and other elements. The three-dimensional model of inventory items 42 can be retrieved from graphical data 12, described in greater detail below. Associated with such inventory items 42 are real property data tags 40. Data tags 40 provide a reference to warranty and insurance information. Furthermore, data tags 40 provide means for referencing inventory items 42 to claim and service history 38 of particular items.

Figure 5:
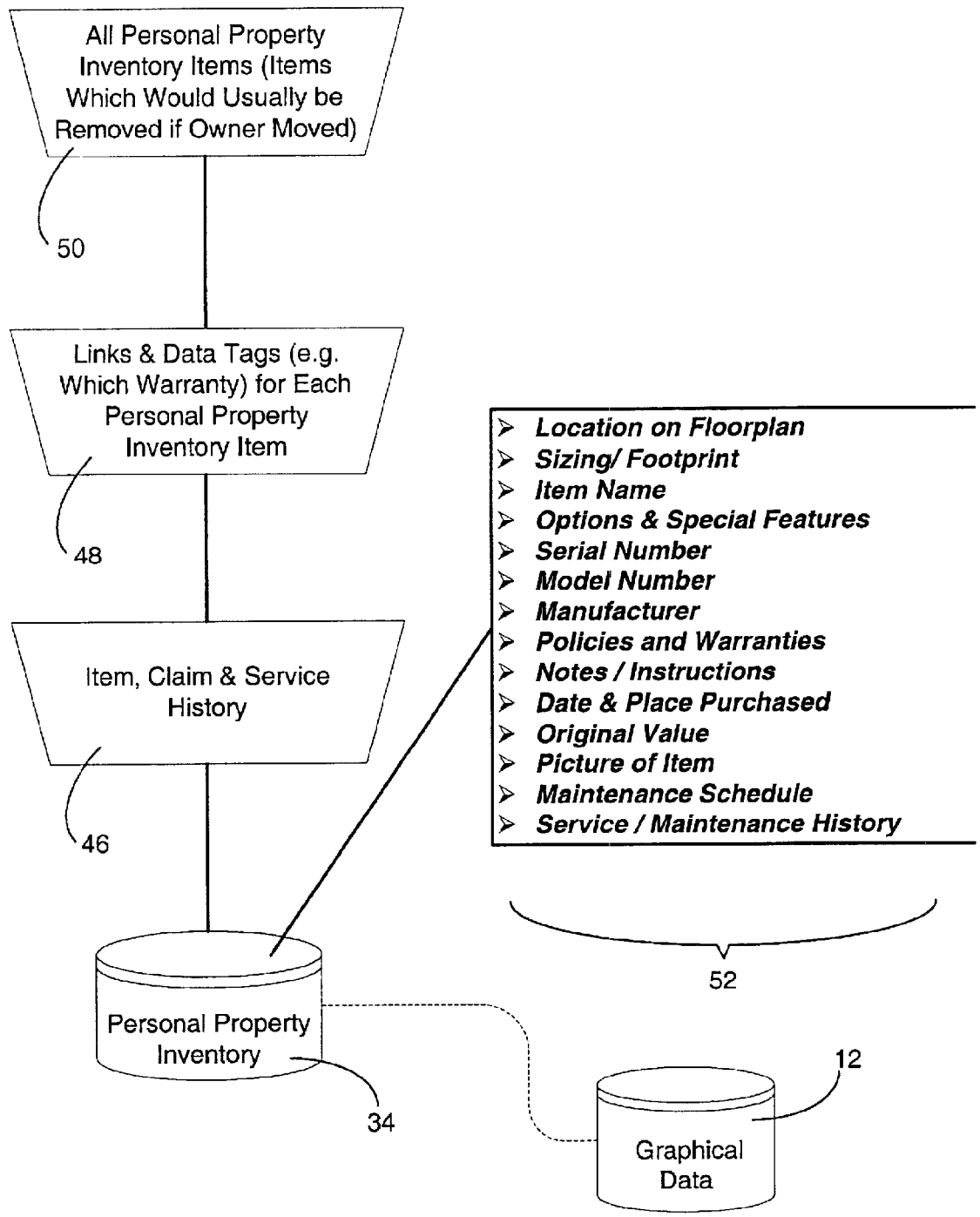
FIG. 5 is a diagram illustrating details of personal property inventory.

As depicted in FIG. 5, other information related to the structure is integrated within real and personal property data 6 as personal property inventory 34. The contents of a structure including all personal property inventory items 50 which would normally be removed if the owner moved from the structure. Personal property inventory items 50 could be, but are not limited to, furniture, artwork, fixtures, appliances and other items. Inventory items 50 may be represented as physical representations in the model from graphic data 12 or they may be represented as textual information. Objects representing physical objects in the structure may be shown in the model as a physical rendition of the object in the form of an icon positioned in the correct location in the structure model. Similar icons are displayed for other items located in the room and other elements of the room such as windows, doors, furniture, etc. Selecting a specific icon will access information relevant thereto and provide access to further details. Alternatively, these objects may be represented in a text index that is associated with the room in which they are located or some other associative model.

Information stored 52 about inventory items 42 could be, but is not limited to, their location on the floor plan of the model, the sizing/footprint of the item, its name, existing options and special features, their serial numbers, model numbers, manufacturer, policies and warranties, notes, instructions, date and place of purchase, original value, picture of each item, maintenance schedules, and service and maintenance histories. Associated with such inventory items 50 are personal property data tags 48. Like data tags 40 previously described, data tags 48 provide a reference to warranty and insurance information. Furthermore, data tags 48 provide means for referencing inventory items 50 to claim and service history 46 of particular items.

Figure 6:
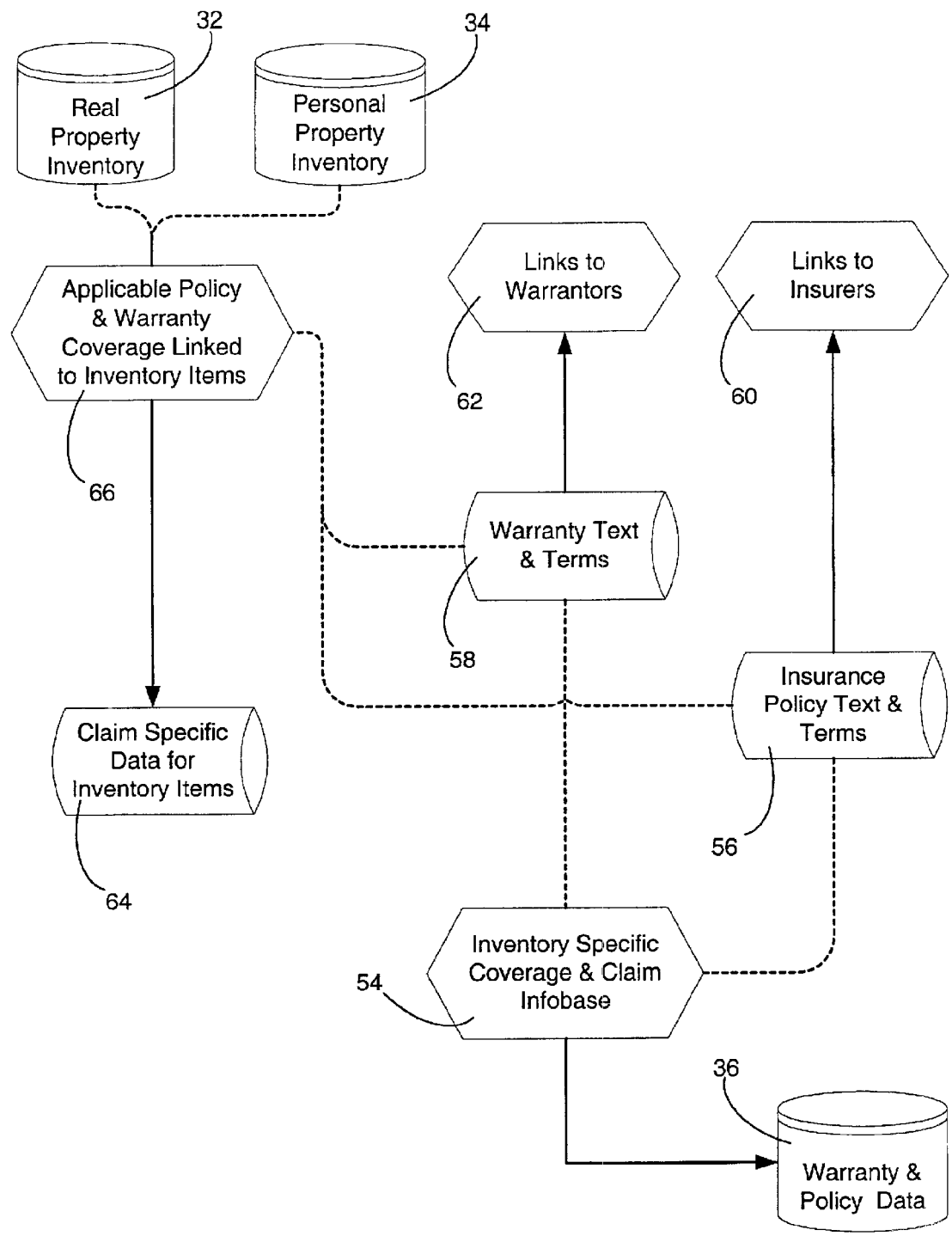
FIG. 6 is a diagram illustrating details of warranty and policy data.

As disclosed in FIG. 6, applicable policy and warranty coverage is linked 66 through means of data tags 40 and data tags 48 to items in real property inventory 32 and personal property inventory 34, respectively. The details of warranties, insurance policies, maintenance records and requirements and other information may also be stored so that it can be accessed in relation to the location of the object related thereto. As a non-limiting example, a floor covering or appliance with a warranty is represented as an icon displayed in or adjacent to a room in the physical model. Selecting the associated floor or appliance icon accesses a file that contains the date the covering or appliance was installed, the term of the warranty, details of warranty coverage, conditions of the warranty, maintenance requirements, recommending cleaning methods, installer information and other related information.

Additionally, within warranty and policy data 36 is an embodiment which provides the user with claim specific data 64 on inventory items for making a claim with a warranty provider or insurance provider. Warranty and policy data 36 also embodies an infobase 54 for keeping track of all inventory specific coverage and claims. Incorporated in infobase 54 is a means for storage and retrieval of warranty text and terms 58, and a means for linking users to warrantors 62. Furthermore, insurance text and terms 56 are stored with means for linking users to insurers 60.

Figure 7:
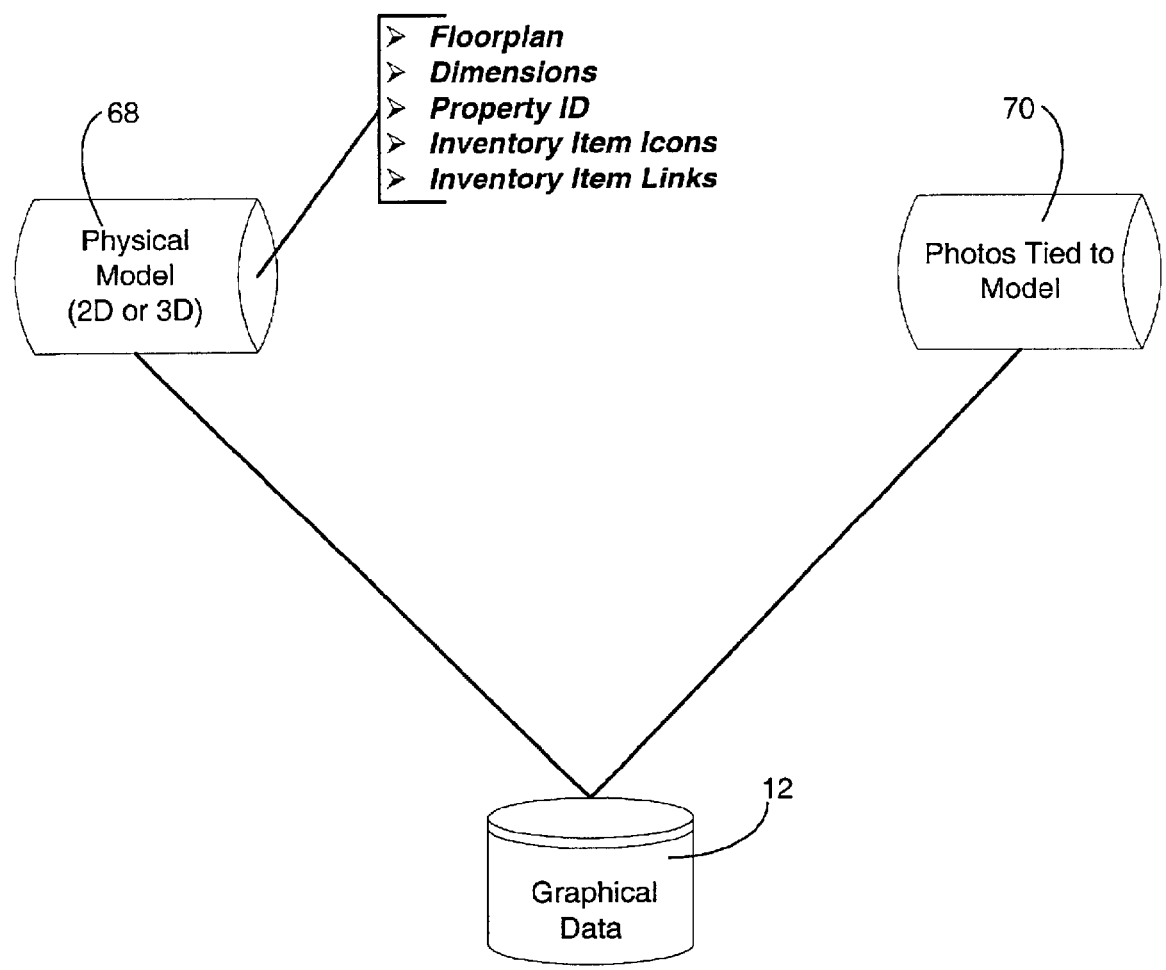
FIG. 7 is a diagram illustrating details of graphical data.

FIG. 7 reveals an additional embodiment of the present invention, graphical data 12 is used to display to the user the contents of master structure data 2. As part of graphical data 12, information about a physical model 68 are collected. Physical models 68 can be two-dimensional or three-dimensional containing information such as floor plans, dimensions, property ID, inventory item icons, and inventory item links. As a non-limiting example, two-dimensional physical model 68 which reflect plan views of each floor of the structure may be used. These physical models 68 represent the physical dimensions and attributes of the structure and its various components. Dimensions on which the physical model 68 is based may be acquired from advanced G.P.S. or satellite systems, by scanning blueprints, by access to other databases, or be taken from as-built structure plans, direct physical measurement, or other physical measurement systems such as infrared or other electronic systems so that they accurately reflect the existing state of the structure. Photographs 70 can be inputted thru scanning or digital means and become tied to physical model 68 for a user to view when observing physical model 68.

Figure 8:
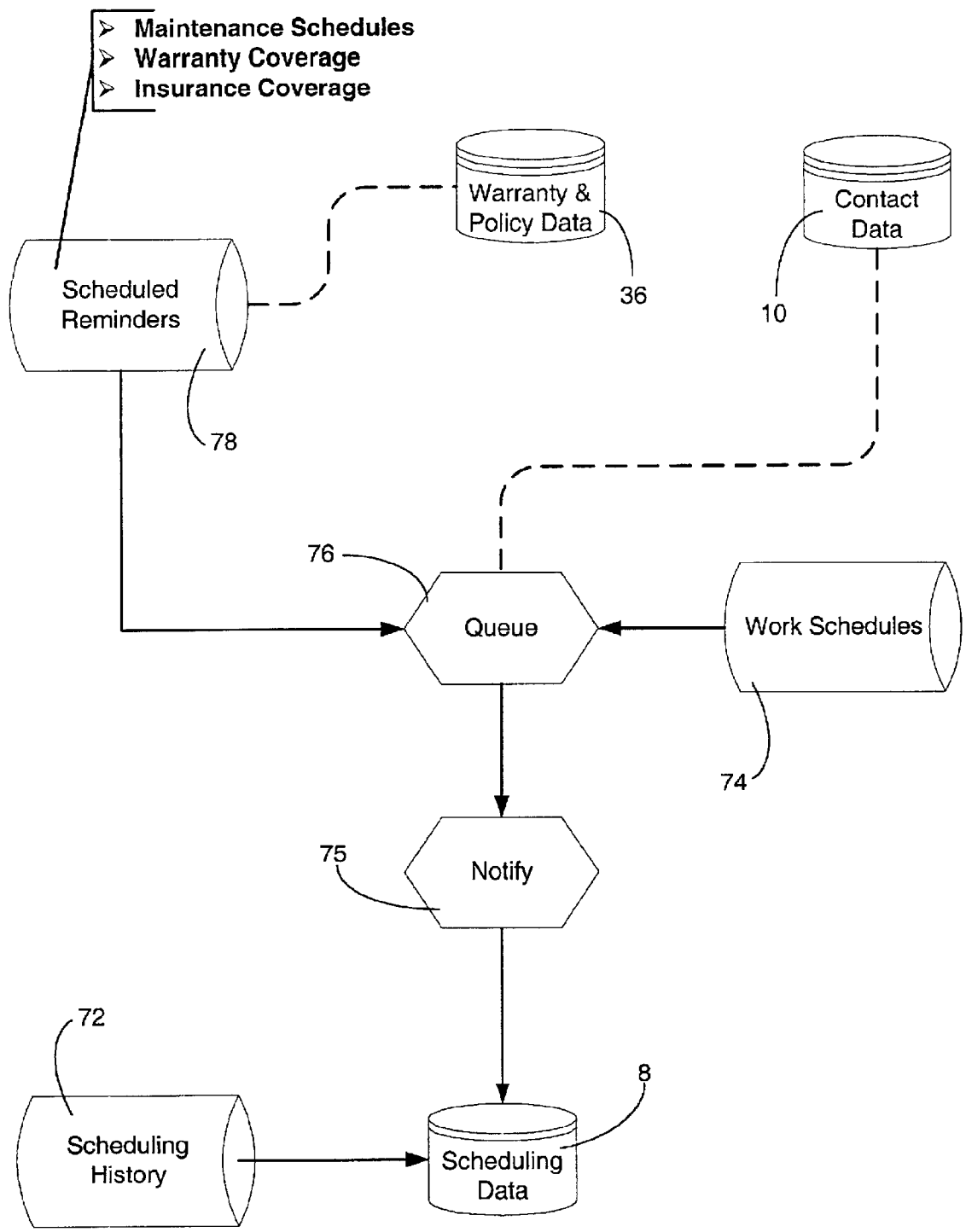
FIG. 8 is a diagram illustrating details of scheduling data.

Turning now to FIG. 8, what is shown is scheduling database 8. The present invention is designed to allow the user to record information regarding the dates of purchase of various components and/or contents contained in the structure, and the vendors from which these various components or contents have been purchased. This information further incorporates warranty and policy data 36. Once this information has been entered, the data is synched with a scheduling function having scheduled reminders 78 which track various events such as maintenance schedules, warranty coverage, insurance coverage, and other information. As it is determined that service on an item or the structure itself is needed, scheduled reminders 78 are queued in queue 76. At this time, contact data 10 is retrieved from contact database 10 containing information as described below. Subsequently, work schedules 74 for needed professionals, insurers, banks, warranty holders, etc. are obtained. These work schedules and the information about the scheduled reminders are automatically provided to the user through a notifier 75. This process can occur as often as needed to track and schedule several events. Upon notification, a scheduling history 72 is generated, which is stored in scheduling database 8. Scheduling history 72 can be retrieved later if necessary and includes information pertaining to each project.

Other data that may be entered intending to be included into scheduled reminders 78 might include anticipated life spans, wear and tear schedules, insurance policies and warranty requirements. These may be incorporated into the records of the present invention so that items may be properly valued and their replacement or repair scheduled and budgeted in advance.

The notify 75 feature of the present invention alerts the owner and/or others of important events regarding structure maintenance and protection. An owner may be notified of the impending requirements so that they may be scheduled and accomplished. An owner or user may also designate a particular contractor or maintenance provider to accomplish an event and have the system automatically generate the necessary authorization to have a service provider accomplish the task. This is done by importing contact data from contact database 10 as discussed below. Upon the completion of an event or service, the record may be updated to reflect the new improvement or condition.

Figure 9:
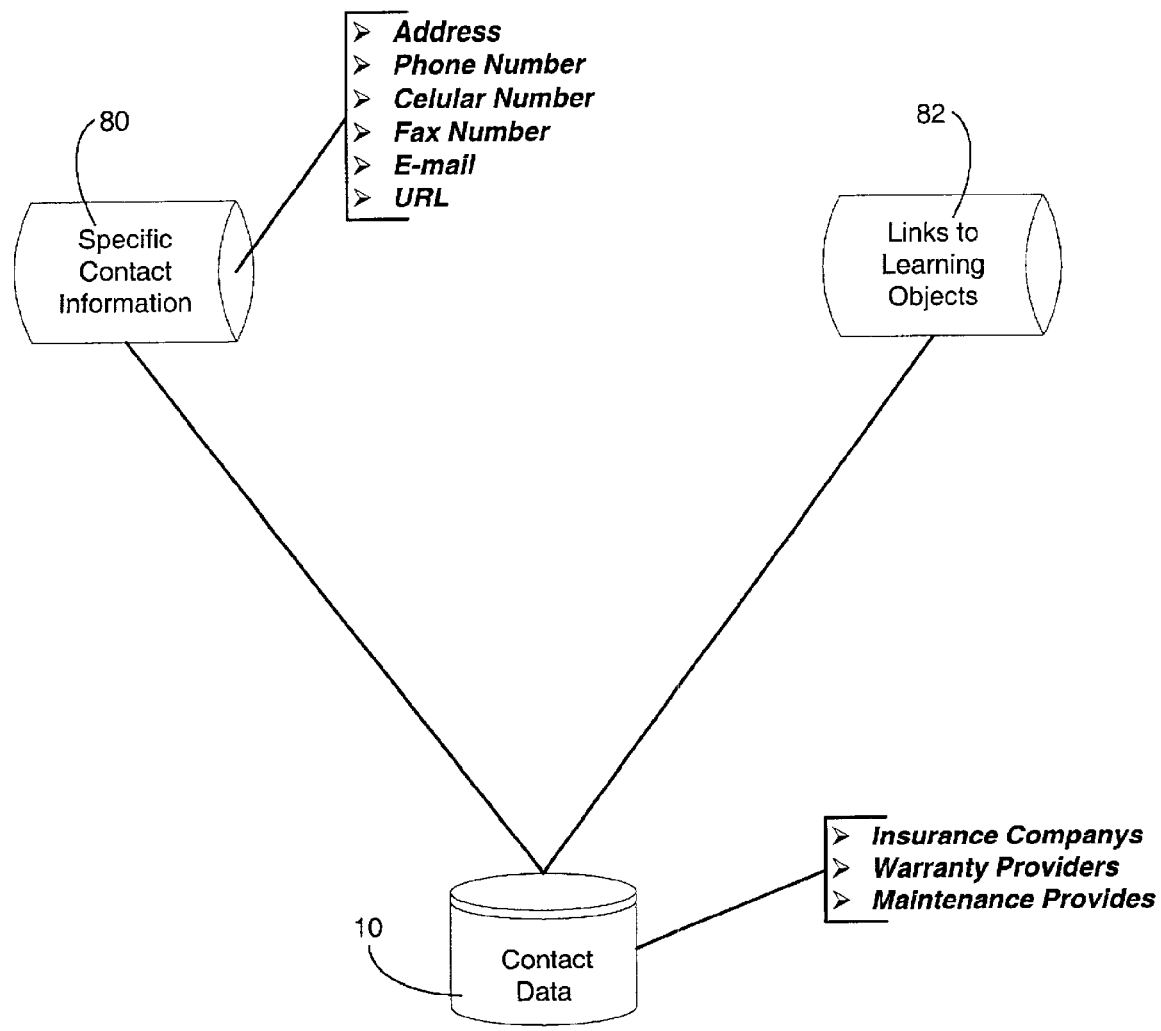
FIG. 9 is a diagram illustrating details of contact data.

FIG. 9 shows a detailed illustration of contact data 10. Contact data 10 may contain specific contact information 80 about insurance companies, warranty providers, maintenance providers, and any other personnel/information relevant to the structure and any items or non-physical information. The embodiments of the present invention may utilize computerized text files, databases, digital photographs and other images and models as well as other records to generate specific content information 80 contained in contact database 10. Once this information is compiled it is storied in contact data 10 to be used in conjunction with the embodiments of the system of the present invention.

As also shown in FIG. 9, the present invention provides for direct linking to other programs to perform some functions of the present invention, or to other databases. For example, links may be provided to databases containing bank accounts and credit accounts, etc. This information may then be used by the system of the present invention to perform its designated function. In addition, links may be incorporated into the system that link to vendors, materials suppliers, professional services providers, etc. These links are shown generally in FIG. 9 as links to learning objects 82.

Figure 10:
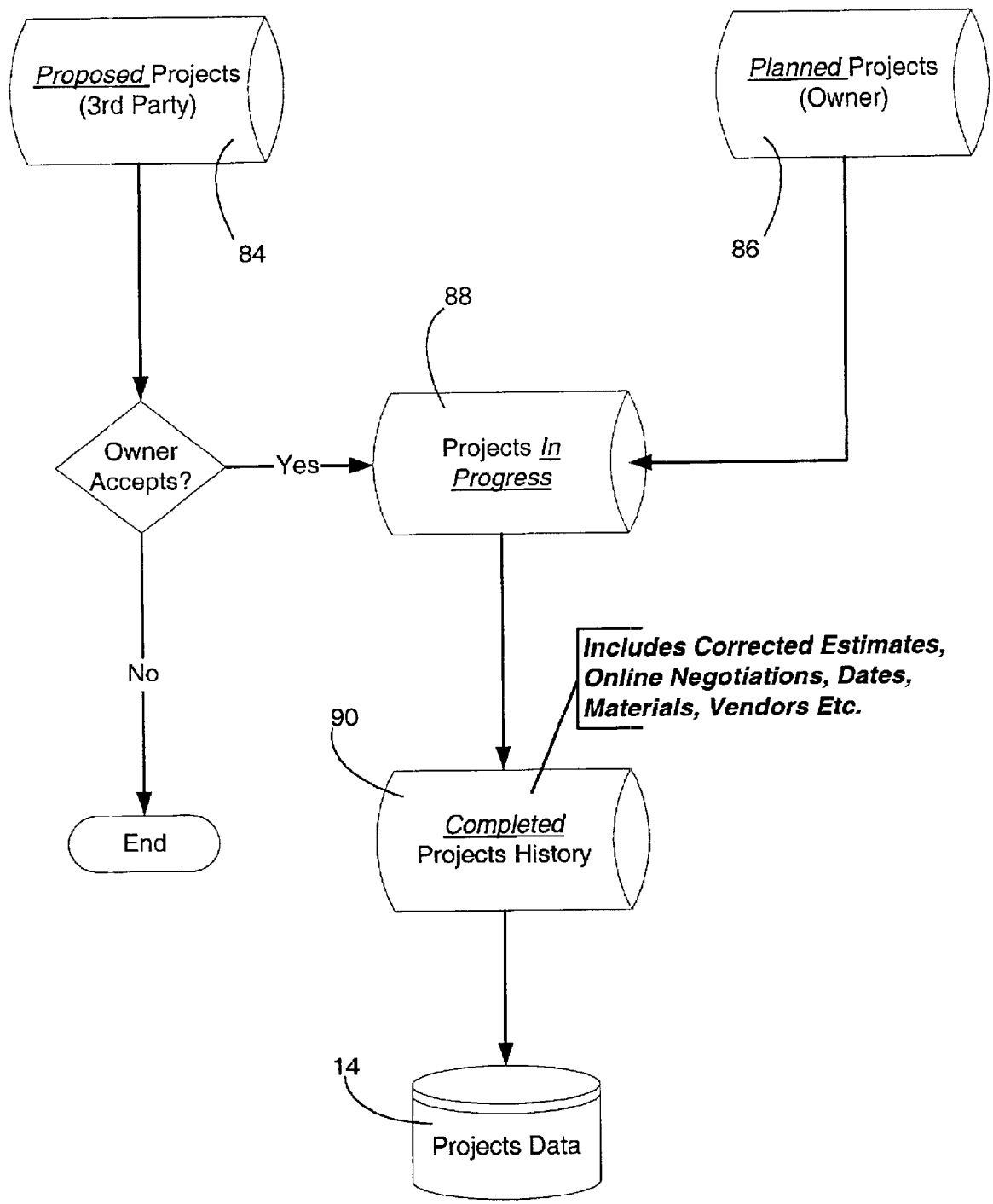
FIG. 10 is a diagram illustrating details of projects data.

FIG. 10 shows a detailed illustration of projects database 14. The essence of this database is to record and track proposed projects 84, planned projects 86, and projects that are currently in progress 88 regarding the structure. As discussed above, and working in conjunction with projects database 14, a physical model is provided so that contractors and others may compile and submit estimates to the system of the present invention that are based on the dimensions reflected in the model, thereby negating the need to perform an on-site visit. Availability of this model will allow non-local contractors and others from remote locations to competitively bid a project without incurring costs associated with site visits and independent measurements.

Projects database 14 allows any person involved or that may possibly be involved in a project to access the information contained therein. In addition, proposed projects 84 may arise from the owner, third persons, or from the scheduled database as described above. For example, and as can be seen in FIG. 10, if a project is in need of completion, persons involved or that have potential involvement in the project may access the system and project database 14. Bids may be placed, instructions may be obtained, and other information may be compiled by the owner regarding the project. This information is then either accepted or rejected by the owner of the structure. Upon the completion of a project, the information concerning that project is stored in the completed projects history 90 as contained within projects database 14.

Completed projects history 90 may include information such as project estimates, project negotiations, project dates, completion times, vendors and/or professionals who worked on the project, materials and supplies purchased with their associated costs, and any other information relevant to a project. In addition, the database could be modified to include information pertaining to proposed projects and projects that are currently ongoing. Other types of information that may be stored is records of past stages of the project, and the sequence of construction of a new structure, which can be retained or forwarded to a financial institution to verify progress before payment of the next installment.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

I claim:

1. An electronic model and data storage system for storing, maintaining and retrieving information relating to the contents of an architectural structure, said system comprising:

a computer device comprising:
  a processor; and
  a memory device storing executable and associated operational data structures for processing by the processor;
  a graphical user interface featuring a dimensionally accurate electronic 3-dimensional scaled model of the current state of a structure;
  data structures having electronic links integrated into and displayed on said dimensionally accurate model to provide selective access to information pertaining to one of the structure's contents, construction materials, and digital photographs, allowing a user to select with an input device a location on the electronic model of the structure corresponding to an actual surface on the structure to access data regarding the contents and construction materials of the selected portion of said structure;
  the data regarding the contents of said structure, further comprising warranty and product information including at least one of dates of installation, terms of warranty coverage and conditions, and maintenance requirements;
  communication means for accessing data regarding said structure's contents and construction materials to formulate, bid, and convey a bid back to a structure; and
  wherein said data corresponding to the contents of said structure is accessible via a computer network by a user according to access rights corresponding to said user.

2. The system of claim 1, wherein warranty and product information further comprises at least one of cleaning method information, installer notes and inventory data.

3. The system of claim 1, wherein said computer network is a global information network.

4. The system of claim 1, wherein the data corresponding to the contents of said structure further comprises information relating to insurance coverage corresponding to at least one of said structure and said contents of said structure.

5. The system of claim 1, wherein the data corresponding to the contents of said structure is represented as textural information on said electronic model.

6. The system of claim 1 wherein said system is interactive.

7. The system of claim 1, further comprising:
an event timing module to monitor maintenance intervals corresponding to the contents of said structure and warn a structure owner prior to the expiration of the recommended maintenance interval.

* * * * *